US008821776B2

(12) United States Patent
Caballero López et al.

(10) Patent No.: US 8,821,776 B2
(45) Date of Patent: Sep. 2, 2014

(54) PROCESS FOR THE ADDITIVATION OF SYNTHETIC FIBRES, ARTIFICIAL FIBRES AND POLYMERS WITH SPECIAL PROPERTIES

(75) Inventors: Miguel Ángel Caballero López, Puebla de Alfinden (ES); Patricia Zagalaz Lasierra, Graus (ES); Sergio José Segura Guajardo, La Joyosa (ES); Maria Elena Piera Camas, Zaragoza (ES); Eduardo Pérez García, Zaragoza (ES); Carlos Tellez Ariso, Zaragoza (ES); Joaquin Coronas Ceresuela, Zaragoza (ES); Jesús Santamaría Ramiro, Zaragoza (ES)

(73) Assignee: Sociedad Anonima Minera Catalano-Aragonesa, Zaragoza (ES)

( * ) Notice: Subject to any disclaimer, the term of this patent is extended or adjusted under 35 U.S.C. 154(b) by 1560 days.

(21) Appl. No.: 11/938,337

(22) Filed: Nov. 12, 2007

(65) Prior Publication Data

US 2008/0128941 A1    Jun. 5, 2008

(30) Foreign Application Priority Data

Nov. 14, 2006  (EP) .................................. 06380293

(51) Int. Cl.
*D01F 1/02* (2006.01)
*D01F 1/06* (2006.01)
*D01F 1/10* (2006.01)
*C08K 7/02* (2006.01)

(52) U.S. Cl.
CPC ........................................ *C08K 7/02* (2013.01)
USPC .................. 264/211; 264/328.17; 264/328.18

(58) Field of Classification Search
USPC .................................. 264/211, 328.17, 328.18
See application file for complete search history.

(56) References Cited

U.S. PATENT DOCUMENTS 5,190,775 A * 3/1993 Klose ................................. 426/2
5,364,627 A * 11/1994 Song .............................. 424/443
5,552,149 A * 9/1996 Lebo et al. .................... 424/408

(Continued)

FOREIGN PATENT DOCUMENTS

EP           0557880 A1 *  9/1993
EP           1564242 A1 *  8/2005

*Primary Examiner* — Leo B Tentoni
(74) *Attorney, Agent, or Firm* — Notaro, Michalos & Zaccaria P.C.

(57) ABSTRACT

A process for the additivation of synthetic fibers, artificial fibers and polymers conferring special properties to them, the process comprising the following steps: the encapsulation of an additive in the pores of a porous material; the incorporation of particles of the porous material (capsules) into the polymer matrix of the fiber; and spinning of the fiber; the capsule withstanding the temperatures and other conditions of the different manufacturing processes which the fibers might undergo and the introduction of the additive into the polymer matrix thereof, characterised in that the porous material is a metal oxide, a zeolite, an aluminophosphate, clay, a carbon material, a hybrid organic-inorganic material or a porous polymer. The invention is an improvement in the additivation process of fibers and polymers in terms of the nature of the capsules used, the increase in the storage capacity of additives thereof, the process of incorporating the capsules into the polymer matrix of the fibers and the fact that the present invention refers to an industrial process.

39 Claims, 5 Drawing Sheets

(56) References Cited

U.S. PATENT DOCUMENTS 5,911,224 A * 6/1999 Berger .................. 131/332
2003/0013369 A1 * 1/2003 Soane et al. .................. 442/181
2006/0009611 A1 * 1/2006 Hayes .................. 528/272
2006/0100325 A1 * 5/2006 Leite et al. .................. 524/115

* cited by examiner

PROCESS FOR THE ADDITIVATION OF SYNTHETIC FIBRES, ARTIFICIAL FIBRES AND POLYMERS WITH SPECIAL PROPERTIES

FIELD OF THE INVENTION

This invention relates to a process for the additivation of synthetic fibres, artificial fibres and polymers with special properties conferring special properties to them by means of the encapsulation of additives in porous materials, which confer the desired special properties. The encapsulation of additives is provided with the aim of protecting them from the conditions of the manufacturing process of fibres and polymers and which will permit their controlled dosing.

PRIOR ART OF THE INVENTION

A large number of processes are known for encapsulation and microencapsulation of additives with capsules of different nature and for different additives and/or substances, which are applied to very different fields. The majority of them make reference to encapsulations and/or microencapsulations with polymers or other organic compounds, and it is not possible to protect additives from the process conditions for the majority of the polymer-based products. For that reason, most of these organic microcapsules are applied in the finishing stages and not during the manufacturing processes, this application being done superficially which therefore limits the duration of their effect due to the action of rubbing, washing and the general, due to the use given to the product.

WO 01/06054 A1 claims a method for synthesising nanoparticles for treatments of fibres, yarns and fabrics, which are applied during the finishing of the fibre, and consisting of a polymeric envelope with functional groups.

There also exist numerous patents in which some kind of porous materials are used for encapsulating substances, mainly ions and complexes which give rise to catalysts (e.g.: U.S. Pat. Nos. 5,944,876, 4,199,478): for encapsulating perfumes and additives for detergents and softeners (e.g.: U.S. Pat. No. 5,691,303, WO 98/12298); for encapsulating dyes and pigments (e.g.: U.S. Pat. No. 4,874,433); for the permanent encapsulation of radioactive or poisonous gases or waste (e.g.: EP 0 049936) and exchanged with silver cations, they are used as anti-microbial agents in fibres (e.g.: US 2002023304, KR 9702893), but in no case are they used for the internal additivation of fibres and polymers, the object of the encapsulation being the sustained and prolonged release of the additives and/or their protection from the process or external conditions.

Among the patents encountered, numerous processes are also described for the incorporation of microcapsules into textiles. These patents claim processes for the incorporation of microcapsules into textile articles in the finishing stages since the different capsules used so far are of an organic nature and they would not resist the conditions of the different manufacturing processes for fibre (e.g.: WO 02/90643 A1, WO 03/040453 A1).

A process for the additivation of synthetic fibres, artificial fibres and polymers by means of the encapsulation of additives is known from EP 1564242 A1, which describes the use of aluminosilicates having nano pores as porous material. However, by using aluminosilicates and it is difficult to obtain an adequate pore capacity needed for highly efficient use on an industrial scale. Another problem of using aluminosilicate as porous material is that the material forms clumps during the encapsulation process.

DESCRIPTION OF THE INVENTION

It is therefore an object of the present invention to provide a process for the additivation of synthetic fibres, artificial fibres and polymers with special properties conferring special properties to them by means of the encapsulation of additives wherein the encapsulation process can be used at the industrial scale. Further, it is an object of the present invention to obtain a narrow distribution of pores and to obtain an adequate pore capacity needed for highly efficient use on an industrial scale. Finally, the creation of clumps during the encapsulation process shall be avoided.

This object is solved by the present process for the additivation of synthetic fibres, artificial fibres and polymers conferring special properties to them. The process includes at least the steps of encapsulation of an additive in the pores of a porous material, incorporation of particles of the porous material (capsules) into the polymer matrix of the fibre, and spinning of the fibre, the capsule withstanding the temperatures and other conditions of the different manufacturing processes which the fibres might undergo and the introduction of the additive into the polymer matrix thereof. In certain embodiments, the porous material is a metal oxide, a zeolite, an aluminophosphate, clay, a carbon material, a hybrid organic-inorganic material or a porous polymer. The inventive protects the additives from the manufacturing processes for fibres or polymers up to a process temperature of 300° C.

The present specification describes a process for the additivation of synthetic fibres, artificial fibres and polymers by means of encapsulation of the additives in porous materials, said process comprising:

the encapsulation of the additive in the pores of a porous material;
the incorporation of particles of the porous material (capsules) into the polymer matrix of the fibre; and
spinning of the fibre;

the capsules withstanding the temperatures and other conditions of the different manufacturing processes which the fibres might undergo: polymerisation, synthesis, extrusion, spinning, warping, drawing, dyeing, weaving and finishing, permitting the introduction of the additive into the polymer matrix thereof.

The process is characterized in that the porous materials (with melting points and/or decomposition temperatures higher than the process temperature of the fibre to additivate) are selected from the group:

1—Metal oxides, e.g.: silica (microporous, mesoporous, pyrogenic, crystalline, precipitated, gel), aluminas (activated alumina, aluminium trioxide, hydroxides, alpha-alumina, gamma-alumina, bohemite), titanium dioxide (anatase, rutile, gel), magnesium oxide, iron oxide, zinc oxide, zirconium oxide, etc.
2—Zeolites (mordenites, faujasties X and Y, zeolite A, chabazite, silicalite, ZSM-5, ZSM-11, etc.) and mesoporous silicates (MCM-41, SBA-15, etc.).
3—Aluminophosphates and phosphates, e.g.: ALPO-5, VPI-5, etc.
4—Clays, e.g.: kaolin, smectites, vermiculites, atapulgite, sepiolite, etc.
5—Carbon materials, e.g., activated charcoal, molecules sieves of carbon, superactivated charcoal, nanotubes of carbon, lignite, etc.

6—New materials, e.g.: organic-metallic porous structures (porous metal-organic frameworks—MOF's), i.e. microporous crystalline solids that consist of three-dimensional networks of inorganic and organic building units including MOF-1, MOF-2, MOF-3, MOF-4, MOF-5, MOF-6, MOF-8, etc. Further including isoreticular metal organic framework materials (IR-MOF-n), HKUST-1, MIL-53, MIL-100, MIL-101, zeolitic imidazolate framework (ZIF), etc., periodic mesoporous organosilicas (PMO), i.e. a silica matrix through the combination of covalently linked organic and silica components. The material characteristics can be tuned for a particular application by changing the organic groups used as "bridges" in the silica matrix. PMO are formed by hydrolytic polycondensation of bridge-bonded silsequioxanes [(RO)3Si—R—Si(OR)3] in the presence of surfactant micelles including PMO-SBA-15, PMO-SBA-16, PMO[KIT-5]-n, Bifunctional PMOs, etc.; hybrid organic-inorganic porous materials, etc.

7—Porous polymers, e.g. poly 3-chlorostyrene, polymethacrylo-nitrile, styrene-divinyl-benzene, etc., with melting points and/or decomposition temperatures higher than the process temperature of the fibre to additivate.

In this way, the process is valid for a variety of pore sizes of the different materials.

Depending on the hydrophilicity of the additive to encapsulate and on the kinetic diameter of its molecules and the application, which the product is going to be used for, one or another type of porous material will be chosen as the capsule, the one which will be the most suitable in each case in terms of pore size, particle size, BET area (Brunauer, Emmett and Teller method—volume of pores which can be occupied by the additive), chemical affinity for the additive to encapsulate and price.

The present invention describes a substantial improvement in the additivation process of fibres and polymers in terms of the nature of the capsules used, the increase in the storage capacity of additives thereof, the process of incorporating the capsules into the polymer matrix of the fibres and the fact that the present invention refers to an industrial process.

The present invention provides important advantages compared to already existing encapsulation processes by permitting any kind of additive to be incorporated in the interior of the fibres or polymers in the stages of reaction, synthesis, extrusion, injection or spinning, protecting them from use, washing or rubbing, at the same time as releasing them in a sustained way.

This invention permits the manufacture of fibres and polymers with special properties whose duration in time is extended in comparison with already existing additivation processes.

More specifically, the present invention provides an alternative method for additivation of fibres and polymers permitting any kind of additive to be introduced inside the polymer matrix, thus prolonging the duration of the desired effect.

Moreover, the present invention implies an increase in the capacity of the capsules compared to known processes due to new porous materials, especially mesoporous materials, as capsules permitting the introduction of a larger quantity of additive inside the fibres or polymers.

Process of additivation of fibres, in which the porous materials used as capsules are porous materials (micro-, meso- and macroporous), preferably microporous (pore size <2 nm) and mesoporous (2 nm<pore size<50 nm) and more preferably mesoporous, with a particle size of 50 nm to 200 microns, in such a way that, in the case of additives for textile applications, the porous materials must preferably have a particle size of 100 nm to 50 microns, and more preferably from 500 nm to 5 microns.

The additivation process of synthetic fibres, artificial fibres and polymers by means of encapsulation of the additives in porous materials protects the additives from the manufacturing processes of the fibres up to a process temperature of 300° C.

The additivation process of synthetic fibres, artificial fibres and polymers by means of encapsulation of the additives in porous materials, protects the additives from washing, rubbing and use, prolonging the duration of the effect of the additive when the capsules are introduced in the polymer matrix.

Additivation process of fibres, in which the encapsulation conditions of the additive entail the non-permanent encapsulation thereof within a porous material, with controlled dosing of the additive taking place.

Moreover, the moisture content (desorbible) in the porous materials must preferably be less than 5% and more preferably less than 1%. To achieve this, the porous material must be activated/dehydrated by heating to a temperature of between 150-500° C.

Additivation process in which the additive to encapsulate is mixed with the porous material during a period of time that can vary between 5 and 48 hours, with continuous stirring in order to promote additive/capsule contact, and heating or cooling in order to maintain a temperature that can vary between −5 and 200° C. (depending on the type of additive to encapsulate and the nature of the porous material selected as capsule) in order to accelerate the adsorption equilibrium between the additive and the porous particles. The additive-capsule proportions can be from 1/1 to 1/200, with 1/200 being preferable.

The porous material with the encapsulated additive is subjected to certain post-treatments consisting of centrifugation or filtration of the sample, drying of the capsules containing the additive, at variable temperature and times, depending on the type of additive, which can be from 25 to 200° C. for a period of time from 1 to 48 hours, and grinding and/or micronisation thereof, for a period of time that can vary from 3 minutes to 5 hours, which will break up any possible clumps formed during the encapsulation process.

Additivation process of fibres, in which the driving force to dose the additive is the difference in concentration thereof between the capsule and the polymer matrix of the fibre, and, in turn, between the matrix of the fibre and the outside.

Additivation process of fibres in which the adsorption conditions of the additive entail the permanent encapsulation thereof within a porous material, conferring a permanent property to the fibre.

For the permanent encapsulation of an additive, a porous material is chosen with a pore size less than the molecule size of the additive, which, in order to be introduced, are subjected to a prior treatment such as oxidation, in such a way that the structure is modified and can pass through the pores. Once encapsulated, the reverse process is applied to the additive so that the molecule recovers its size.

In order to achieve the permanent encapsulation of an additive, a porous material is used with a sufficiently large pore size so that the additive can enter into its pores. Following encapsulation of the additive, a post-treatment is carried out with xylanes, boranes or germanes, which are adsorbed in the mouth of the pores of the porous material and are then oxidised by treating them with steam or other oxidising agents, blocking the outlet of the encapsulated additive.

Additivation process of fibres, in which the encapsulation of the additive is primarily produced by adsorption thereof in the porous material, with absorption, capillary condensation and ion exchange being able to take place between the additive and the capsule.

Additivation process of fibres, in which the incorporation of the capsule into the polymer matrix of the fibre is done during the polymerisation stage.

Additivation process of fibres, in which the incorporation of the capsule into the polymer matrix of the fibre is done during the spinning stage.

Additivation process of fibres, in which the incorporation of the capsule into the polymer matrix of the fibre is done during the spinning of the polymer before or during the melting thereof or together with the dilution of the polymer, depending on the type of spinning.

Additivation process of fibres, in which the incorporation of the capsule into the polymer matrix of the fibre is done by dusting the capsules on the filament at the outlet from the spinner in the phase in which the polymer has not yet solidified.

Additivation process of fibres, in which the additives to encapsulate are among others: perfumes, essences, cosmetics (anti-cellulite, anti-wrinkle, firming, anti-oxidant, down retardant, moisturising, deodorant, aloe-vera, essential oils, collagen, natural extracts, etc.), menthol, anti-mosquito, anti-stain, anti-odour, anti-mite, medicines (anti-inflammatories, cicatrising, vitamins, antibiotics, etc.), chromophores, dyes, colorants, etc.

An additivation process of polymers by means of encapsulation of the additives in porous materials, comprising:
- the encapsulation of the additive in the pores of the material;
- the incorporation of the particles of porous material (capsules), preferably nanoporous, into the matrix of the polymer; and
- polymerisation, extrusion and/or injection of the polymer; withstanding the temperatures and other conditions of the different manufacturing processes the polymers might undergo: polymerisation, extrusion, injection, setting, thermoforming, cross-linking, moulding, machining and finishing, permitting the introduction of the additive into the matrix thereof.

Process of additivation of polymers, in which the porous materials used as capsules are porous materials, preferably microporous (pore size <2 nm) and mesoporous (2 nm<pore size<50 nm) and more preferably mesoporous, with a particle size of 50 nm to 200 microns, in such a way that, in the case of additives for plastics applications, the porous materials must preferably have a particle size of 500 nm to 40 microns.

Additivation process of polymers, in which the incorporation of the capsule into the polymer matrix is done during the stages of polymerisation, extrusion, injection or setting.

DESCRIPTION OF A PREFERRED EMBODIMENT

Figure 1:
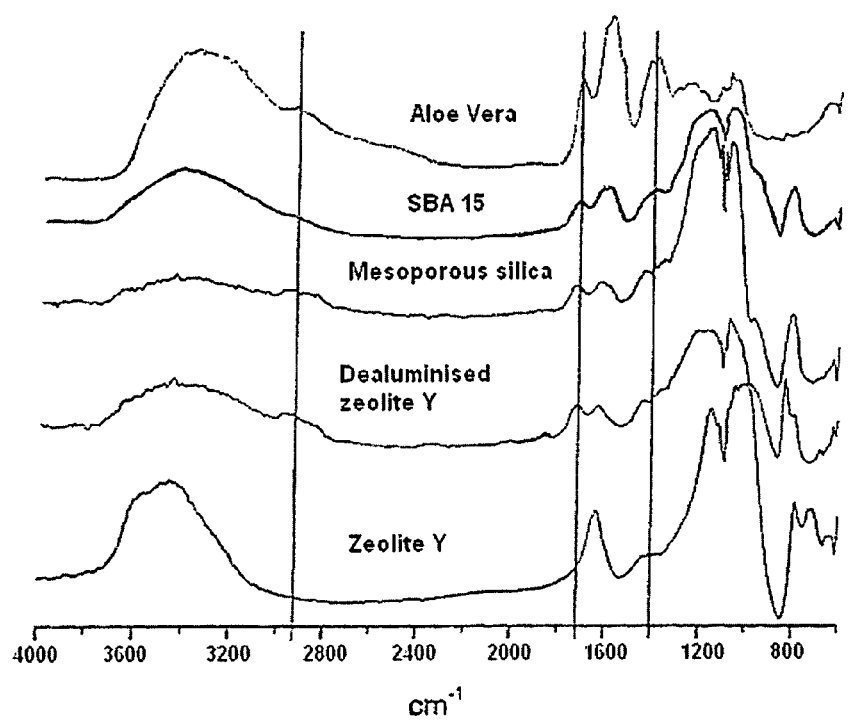
FIG. 1.—Shows a comparative graph of the infrared spectra of a series of samples of porous materials (SBA 15, mesoporous silica, dealuminised zeolite Y and zeolite Y) encapsulating aloe-vera and spectrum of aloe-vera (aloe).

The present invention relates to a process for the additivation of synthetic fibres, artificial fibres and polymers based on the adsorption of the additives in nano/microparticles of porous materials which comprises the process of encapsulation, the introduction of the capsule in the polymer and the processing thereof for the manufacture of the final article.

The encapsulation techniques existing so far are based on polymeric and organic capsules which would not be able to withstand the conditions of the processes to which a polymer for end uses such as textiles and plastics is subjected. Also, the final size of the capsules is in most cases too large for being able to be introduced during the manufacturing process of the fibres. For that reason, the encapsulated additives are applied superficially to the fibres in the finishing stages.

The object of the present invention is the development of a process that would permit different additives to be introduced in the polymer matrix of the fibres or polymers and therefore prolong their effect. To achieve this, it is proposed to use nano/microparticles of porous materials as capsules, inorganic or organic porous materials (with melting points and/or decomposition temperatures higher than 300° C., selected from the group:

1—Metal oxides, e.g.: silica (microporous, mesoporous, pyrogenic, crystalline, precipitated, gel), aluminas (activated alumina, aluminium trioxide, hydroxides, alpha-alumina, gamma-alumina, bohemite), titanium dioxide (anatase, rutile, gel), magnesium oxide, iron oxide, zinc oxide, zirconium oxide, etc.

2—Silicates, e.g.: zeolites (mordenites, faujasties X and Y, zeolite A, chabazite, silicalite, ZSM-5, ZSM-11, etc.) and mesoporous silicates (MCM-41, SBA-15, etc.).

3—Aluminophosphates and phosphates, e.g.: ALPO-5, VPI-5, etc.

4—Clays, e.g.: kaolin, smectites, vermiculites, atapulgite, sepiolite, etc.

5—Carbon materials, e.g., activated charcoal, molecules sieves of carbon, superactivated charcoal, nanotubes of carbon, lignite, etc.

6—New materials, e.g.: organic-metallic porous structures (MOF's), mesoporous organosilicas, hybrid organic-inorganic porous materials, etc.

7 Porous polymers with melting points and/or decomposition temperatures higher than the process temperature of the fibre to additivate.

The choice of these porous materials as capsules is due not just to their known capacity for adsorption and their porous structure but also because these materials display high chemical resistance and mechanical stability, and their thermal stability reaches temperatures of higher than 300° C.

Moreover, they can be modified by chemical and physical deposition techniques, ion exchange, etc., These characteristics of the porous materials make them suitable as capsules in which to introduce additives that they protect from the conditions of the different manufacturing processes, that might be undergone both by the fibres: polymerisation, synthesis, extrusion, spinning, warping, drawing, dying, weaving and finishing, and by the polymers: polymerisation, extrusion, injection, setting, thermoforming, cross-linking or moulding.

Being protected by the capsule, the additives can be introduced into the polymer matrix of the fibre or of the plastic, during the process of manufacture thereof or in the stages in which the polymer is melted, in such a way that the capsules are protected by the polymer if they become detached due to the effect of use, washing and rubbing, remaining inside, with which the life of the garment or article to manufacture becomes prolonged.

Depending on the hydrophilicity of the additive to encapsulate and on the kinetic diameter of its molecules and the application which the product is going to be used for, one or another type of porous material will be chosen as the capsule, the one which will be the most suitable in each case in terms of pore size, particle size, BET area, chemical affinity for the additive to encapsulate and price.

The capsules to use must have a size that can vary between 50 nm and 200 microns, in the case of additives for textile applications the porous particles must preferably have a particle size of from 100 nm to 50 microns, and more preferably from 500 nm to 5 microns.

Examples of Porous Materials Used in the Research:

| Material | Pore size (nm) | BET Area (m2/g) | Particle size (μm) |
|---|---|---|---|
| MCM-41 | 2-9 | 1000 | 2 |
| Zeolite Y | 0.5-1.2 | 300 | 0.5-1 |
| SBA-15 | 14 | 300 | 2-5 |
| Sepiolite | 0.36-1 | 300 | 15 |
| Silica | 30 | 300 | 5 |

For the encapsulation of additives in porous materials, the moisture content (desorbible) of them must preferably be less than 5% and more preferably less than 1%. To achieve this, the porous material must be activated/dehydrated by heating to a temperature of between 150-500° C. Following this pretreatment, the additive to encapsulate is mixed with the capsule for a period of time that can vary between 5 and 48 hours with continual stirring in order to promote additive/capsule contact, and heating or cooling in order to maintain a temperature that can vary between −5 and 200° C. (depending on the type of additive to encapsulate and the nature of the porous material selected as capsule) in order to accelerate the adsorption equilibrium between the additive and the porous particles.

The additive-capsule proportions can be from 1:1 to 1:200, with 1:200 being preferable. The post-treatments that are carried out consist of centrifugation or filtration of the additive capsule mixture, this separation stage being repeated as many times as necessary as far as complete elimination of the excess of non-encapsulated additive. Following separation, the capsules containing the additive might need to be dried, the temperature and times for doing so being variable, depending on the type of additive and the nature of the capsule, which can be from 25 to 200° C. for a period of time from 1 to 48 hours, and grinding and/or micronisation thereof, for a period of time that can vary from 3 minutes to 5 hours, which will break up any possible clumps formed during the encapsulation process. In the encapsulation process of additives the interaction between them and the capsule is mainly produced via adsorption, with interactions by absorption, capillary condensation and ion exchange thereof in the porous material also taking place.

Figure 2:
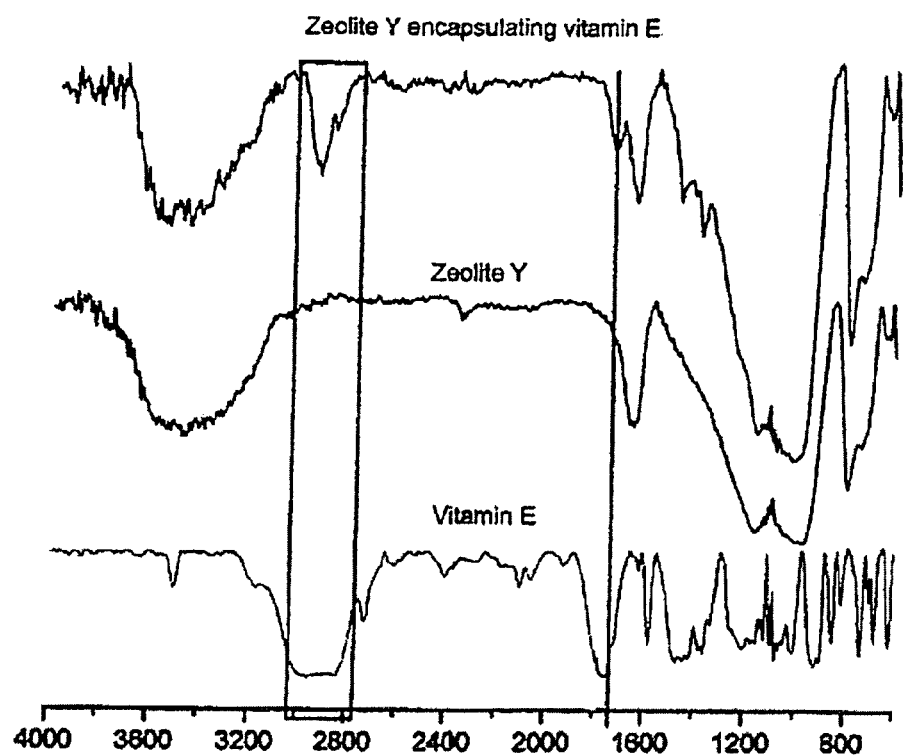
FIG. 2.—Shows a comparative graph of the infrared spectra in transmittance of a zeolite Y standard, of vitamin E and a zeolite Y encapsulating vitamin E.

In order to confirm the encapsulation of the additive in the porous material, measurements are made of the decrease in the BET area, which indicate the volume of pores occupied by the additive, and they are analysed by IR spectroscopy, with results being obtained like those corresponding to FIGS. 1 and 2, which indicate whether the characteristic functional groups of the additive are present in the interior of the capsules or whether, on the other hand, they have degraded during the encapsulation process. The quantity of additive encapsulated is evaluated by means of thermobalance tests (TGA—Thermogravimetry Analysis)) and by extraction of additive and subsequent quantification by HPLC (High Performance Liquid Chromatography).

Figure 3:
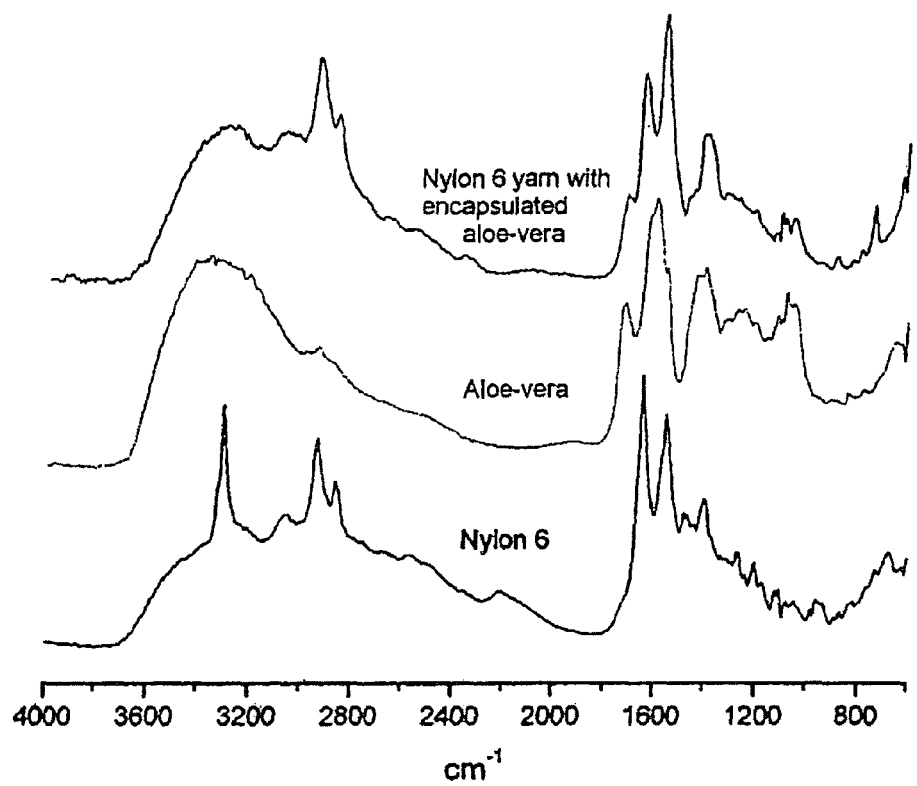
FIG. 3.—Shows a comparative graph of the infrared spectra of a sample of nylon 6, of a sample of aloe-vera and some nylon 6 yarn containing encapsulated aloe-vera.

In order to check the presence of the encapsulated additive in the end product, samples of polymer or of yarn are analysed by IR spectroscopy, with results being obtained like those shown in FIG. 3, which indicate whether the characteristic functional groups of the additive are present in the interior of the capsules or whether, on the other hand, they have degraded during the manufacturing process of the product. The quantity of additive encapsulated is evaluated by means of extraction of the additive and subsequent quantification by HPLC.

Figure 4:
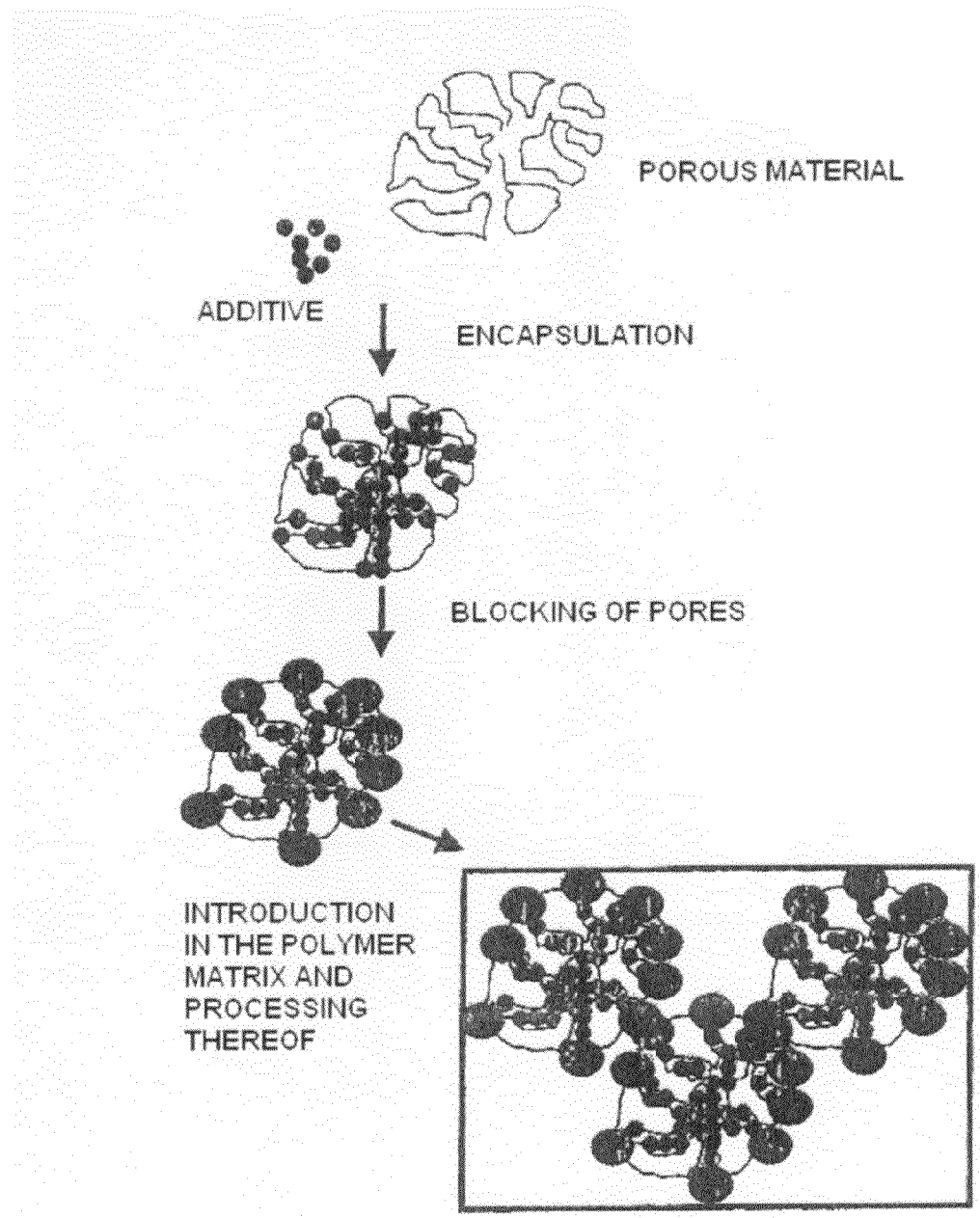
FIG. 4.—Shows a diagram of the additivation process of fibres and polymers in which the additive is encapsulated permanently.

According to the encapsulation conditions and the type of porous material selected for it, a permanent encapsulation of the additive can be carried out (FIG. 4) in such a way that it become retained both during the manufacturing process and during the life of the article, conferring a permanent property to it.

So, in order to achieve the permanent encapsulation of an additive, a porous material is chosen with a pore size less than the molecule size of the additive, which, in order to be introduced, are subjected to a prior treatment such as oxidation, in such a way that the structure is modified and can pass through the pores. Once encapsulated, the reverse process is applied to the additive so that the molecule recovers its size.

Another possibility is to use a porous material with a sufficiently large pore size so that the additive can enter inside and then, following its encapsulation, a post-treatment is carried out with xylanes, boranes or germanes, which are adsorbed in the mouth of the pores of the porous material and are then oxidised by treating them with steam or other oxidising agents, blocking the outlet of the encapsulated additive.

Figure 5:
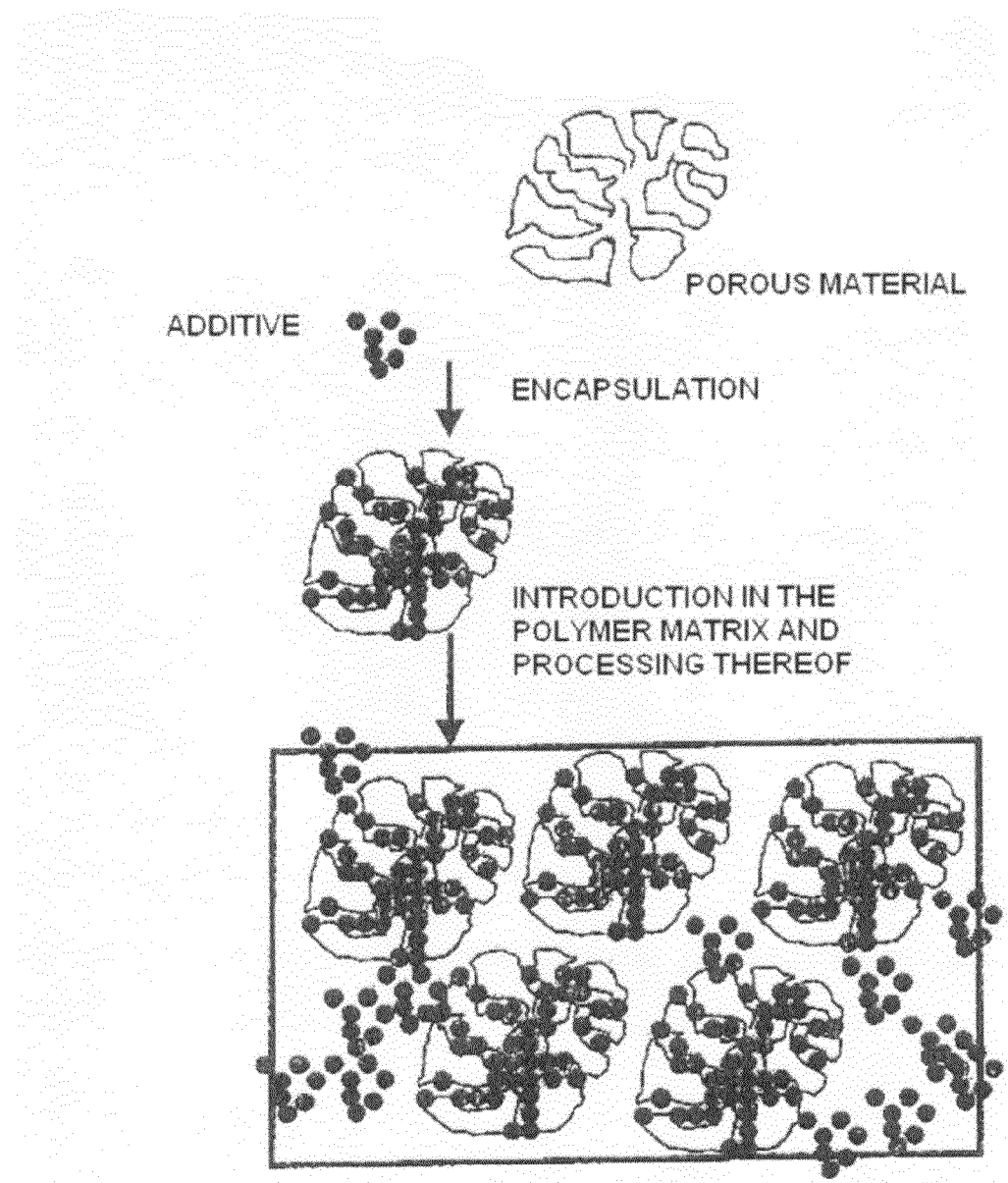
FIG. 5.—Shows a diagram of the additivation process of fibres and polymers in which the additive is encapsulated non-permanently in the porous material, with controlled dosing thereof taking place.

If, following the encapsulation, no post-treatment is carried out for blocking the outlet of the additive, then non-permanent encapsulation thereof is obtained (FIG. 5). The additive encapsulated in the porous material will exit from the pore of that material by diffusion, the driving force being the difference in concentration of additive between the capsule and the polymer, and, in turn, between the polymer and the outside, with controlled dosing of the additive being produced.

Once the additive has been encapsulated in the porous material, the incorporation of the capsule into the polymer matrix of the fibre or of the polymer can be carried out during different stages of the manufacturing process of the article. In the event that the additivation is carried out in artificial or synthetic fibres, the additivation can be undertaken in the following stages:

During the polymerisation reaction: dispersing the capsules in any of the monomers either during, or at the end of, the polymerisation reaction when the pre-polymer or polymer are in the molten phase or in solution.

During the spinning stage: adding it to the polymer just before or during the melting thereof by means of a dosing device for powder, chips or liquid (depending on whether the capsules are in the solid state or in the form of a polymer or liquid masterbatch) connected to the extruder or together with the dissolution of the polymer, depending on the type of yarn, and during the process of solidification or coagulation of the fibres the particles are retained in the polymer matrix.

It is done at the outlet from the spinner in the event that the polymer has not yet solidified or coagulated, with the capsules being dusted on the filament.

The entire spinning process is carried out in the same way and under the same conditions in which the spinning of the un-additivated fibre would be carried out. In the event that the additivation is carried out in polymers for plastic applications, the additivation can be undertaken in the following stages:

During the polymerisation reaction: dispersing the capsules in some of the monomers either during, or at the end of, the polymerisation reaction when the pre-polymer or polymer are in the molten phase or in solution.

During the extrusion stage of the polymer, by means of a dosing device for powder, chips or liquid (depending on whether the capsules are in the solid state or in the form of a polymer or liquid masterbatch) together with the rest of the additives in the compounding stage.

Prior to injection of the piece when the polymer is melted by means of a dosing device for powder, chips or liquid.

In both one case and in the other, in order to facilitate the dosing and dispersion of the capsules in the polymer, and also the processing thereof, a small quantity of a process assistant such as a dispersing and lubricating additive, internal or external, is added during the grinding of the capsules. For example, 0.1-0.3% of a salt of montanic acid is sufficient for facilitating the processing.

The additivation process of the present invention permits the introduction of an infinite range of additives into the polymer matrix which will confer special properties to it, having a long life depending on their nature. The additives to encapsulate are among others: perfumes, essences, cosmetics (anti-cellulite, firming, anti-oxidant, down retardant, moisturising, deodorant, aloe-vera, essential oils, collagen, natural extracts, etc.), menthol, anti-mosquito, anti-stain, anti-odour, anti-mite, medicines (anti-inflammatories, cicatrising, vitamins, antibiotics, etc.), chromophores, dyes, colorants, etc.

In general, any substance that is unstable and/or requires protection from the process conditions and/or requires controlled dosing can be the object of this process. Depending on the additive used, this additivation process will permit a wide variety of end products to be obtained, whose fields of application can be very diverse, among others: sports clothes, underwear, garments and articles for protection, textiles and plastic articles for the medical sector, bathing garments and articles, the textile sector in general, the automobile sector, the electrical sector, cosmetics sector, home textiles and home articles, toys, glasses, detectors, etc.

Referring to the figures, we can see how FIG. 1 shows the infrared spectra of four different porous materials encapsulating aloe-vera, SBA 15, mesoporous silica, dealuminised zeolite Y and zeolite Y, and the spectrum of aloe-vera. It can be seen how, after encapsulation, the four porous materials present numerous peaks corresponding the aloe-vera encapsulated in it. Nevertheless, the spectrum of zeolite Y shows a lower intensity of the characteristic peaks of aloe-vera compared to the other three porous materials indicating that the quantity of aloe-vera encapsulated in it is less than in the others, which can be explained on the basis of the small pore size of zeolite Y. The differences between the materials in terms of pore size and hydrophilicity make some more suitable than others for the encapsulation of a particular additive.

FIG. 2 demonstrates that the additive has been encapsulated in a porous material. In it the infrared spectra of the additive, the capsule and the additive encapsulated in the porous material can be seen. It can be observed that the characteristic peaks of vitamin E located at wavelengths of 1700-1800 and 2800-3000 $cm^{-1}$ (spectrum of vitamin E) appear together with the characteristic peaks of the capsule (spectrum of zeolite Y) in the IR of the samples of vitamin E encapsulated in zeolite Y, displaying a certain shift indicating the adsorption of the molecules in the capsule.

FIG. 3 demonstrates the presence of an additive in the end product following its manufacturing process. In order to check the presence of aloe-vera encapsulated in some nylon 6 yarn, the samples of yarn are analysed by IR spectroscopy, with results being obtained indicating that the functional groups characteristic of aloe-vera at 1000-1750 $cm^{-1}$ appear together with those of nylon 6 in the spectrum of nylon 6 with aloe-vera.

Modes of Embodiment of the Invention

The present invention is additionally illustrated by means of the following examples which are not restrictive of the scope.

EXAMPLES

Example 1

Additivation of Fibres of Polyamide 6 with Aloe-vera

The aim of this additivation is to obtain multi-filament yarn of polyamide 6 for the lingerie market, containing aloe-vera. As aloe-vera is a natural product which would degrade under the processing conditions of the fibres, it needs to be encapsulated prior to being applied to the fibre.

Pure aloe-vera was used extracted from the plant Aloe barbadensis. Given the hydrophilicity of aloe-vera and its composition (4% of bulky molecules of the type sugars, anthraquinones, vitamins, etc.), a nanostructured mesoporous silica (SBA-15) of the following characteristics was chosen for its encapsulation: pore size 8.5 nm, BET area=920 $m^2/g$, particle size 0.5-1 μm.

The encapsulation process was carried out in the following way: 50 kg of SBA-15 were dehydrated by heating at a temperature of 250° C. for 8 h, afterwards the aloe-vera was mixed with the microparticles of SBA-15 for 24 hours, with continual stirring in order to promote aloe/capsule contact and cooling in order maintain a temperature of 25° C. in the mixture. The aloe/capsule proportion was 10/1. The post-treatments that were carried out were centrifugation of the sample with separation of the aloe-vera, drying of the capsules at 100° C. for 48 hours, grinding for 2 hours and then micronisation of the product.

In order to confirm the encapsulation of the additive in the mesoporous silica, measurements were made of the reduction in the BET area which indicated that 80% of the pore volume was occupied by the additive and the samples was analysed by IR spectroscopy, with the SBA-15 curve of FIG. 1 being obtained, where it can be seen that the characteristic peaks of aloe-vera located between wavelengths of 1000-1750 $cm^{-1}$ appear together with the characteristic peaks of SBA-15 in the IR of the sample, displaying a certain shift indicating the adsorption of the molecules in the porous material.

The incorporation of the microcapsules in the polymer matrix of the polyamide 6 fibre was done during spinning of the polyamide. 50 kg of sample were additivated by means of a masterbatch proportioner connected to the extruder of the spinner. 1500 bobbins of 1 kg of polyamide 6 fibre titre 44 dtex and 34 filaments were produced, with a concentration of 3% of the nanoencapsulated additive, at a winding speed of 3950 m/min. IR measurements of the yarn obtained were made which revealed the presence of aloe-vera in its interior.

Example 2

Additivation of Polyethylene with a Thermochromic Additive for Plastics Applications The aim of this microencapsulation is to obtain injected pieces of polyethylene containing a thermochromic additive which changes colour with temperature, for the manufacture of toys.

A thermochromic dye was used based on bis(diethylammonium) tetrachlorocuprate. Given the organophilicity of the additive a zeolite of the following characteristics was chosen for its encapsulation: pore size 0.7 nm, Si/Al ratio=infinity (organophilic), particle size 5-10 μm.

The encapsulation process was carried out in the following way: 50 kg of zeolite were dehydrated by heating at a temperature of 350° C. for 8 h, the dye was mixed with the microparticles of zeolite for 5 hours, with continual stirring in order to promote additive/capsule contact, and at room temperature. The additive/capsule proportion was 5/1. The post-treatments that were carried out were centrifugation of the sample with separation of the thermochromic dye, drying of the zeolite at 100° C. for 8 hours, and grinding for 3 hours.

In order to confirm the encapsulation of the additive in the zeolite, measurements were made of the reduction in the BET area which indicated that 70% of the pore volume was occupied by the additive and it was checked by DSC (Differential Scanning Calorimetry) that the thermochromic effect of the additive was maintained once encapsulated.

The incorporation of the microcapsules in the polymer matrix of the polyethylene was done during extrusion of the polymer, the stage when the additivation of the stabilisers and lubricants required for injection of the polyethylene was also carried out. 50 kg of sample were additivated by means of a powder proportioner to the extruder in such a way that the resulting chips had a 0.2% chromophore content. The pieces obtained following the injection maintained their thermochromic properties.

The invention claimed is:

1. A process for the additivation of synthetic fibres, artificial fibres and polymers conferring special properties to them, comprising:
   encapsulating an additive into the pores of particles of a porous material to form capsules;
   incorporating the particles of the porous material into the polymer matrix of the fibres; and
   spinning the fibres,
   the capsules withstanding the temperatures and pressures of the different manufacturing processes which the fibres will undergo and the introduction of the additive into the polymer matrix thereof, wherein the porous material is a metal oxide, a zeolite, an aluminophosphate, clay, a carbon material, a hybrid organic-inorganic material or a porous polymer, and
   wherein the porous material has mesoporous porosity being a pore size in the range of 2 nm and 50 nm, wherein the particles are of a size in the range of 100 nm to 50 microns, and
   wherein the process protects the additives from washing and rubbing, prolonging the duration of the effect of additive by introducing the capsules into the polymer matrix.

2. The process for the additivation of fibres according to claim 1, wherein the incorporation of the capsules into the polymer matrix of the fibres is done during the spinning stage.

3. The process for the additivation of fibres according to claim 1, wherein the incorporation of the capsules into the polymer matrix of the fibres is done during the spinning of the polymer before or during a melting thereof by means of a dosing device for powder, chips or liquid, depending on whether the capsules are in the solid state or in the form of a polymer or liquid master batch, connected to an extruder or together with a dissolution of the polymer, depending on the type of spinning.

4. The process for the additivation of fibres according to claim 1, wherein the process protects the additives from the manufacturing processes for fibres or polymers at a process temperature range of 150-300° C.

5. The process for the additivation of fibres according to claim 1, wherein the capsules incorporated into the polymer matrix of the fibres is a metal oxide selected from the group consisting of silica, an alumina, titanium dioxide, magnesium oxide, iron oxide, zinc oxide, and zirconium oxide.

6. The process for the additivation of fibres according to claim 1, wherein the capsules incorporated into the polymer matrix of the fibres is of a material selected from the group consisting of an aluminophosphate, a phosphate, a zeolite and a mesoporous silicate.

7. The process for the additivation of fibres according to claim 1, wherein the capsules incorporated into the polymer matrix of the fibres is a clay selected from the group consisting of kaolin, smectite, vermiculite, atapulgite, and sepiolite.

8. The process for the additivation of fibres according to claim 1, wherein the capsules incorporated into the polymer matrix of the fibres is a carbon material, selected from the group consisting of activated charcoal, molecules sieves of carbon, superactivated charcoal, nanotubes of carbon, lignite.

9. The process for the additivation of fibres according to claim 1, wherein the capsules incorporated into the polymer matrix of the fibres is a porous polymer with melting points and/or decomposition temperatures higher than the process temperature of the polymer to additivate.

10. The process for the additivation of fibres according to claim 1, further comprising the step of non-permanent encapsulation of an additive within a porous material, for controlled dosing of the additive taking place.

11. The process for the additivation of fibres according to claim 10, wherein the porous material is activated/dehydrated by heating to a temperature of between 150-500° C. to obtain a moisture content in the porous materials of less than 5%.

12. The process for the additivation of fibres according to claim 10, wherein the additive to encapsulate is mixed with the porous material during a period of time varying between 2 to 24 hours, with continuous grinding in a ball mill in order to promote additive/capsule contact, and heating or cooling in order to maintain a temperature varying between −5° C. and 80° C., depending on the type of additive to encapsulate and the nature of the porous material selected as capsule, in order to accelerate the adsorption equilibrium between the additive and the porous particles, in such a way that the additive-capsule proportions being in the range from 1/10 to 1/1.

13. The process for the additivation of fibres according to claim 10, further comprising a post-treatment step consisting of micronisation, for a period of time varying from 3 minutes to 5 hours.

14. The process for the additivation of fibres according to claim 10, wherein the driving force for dosing of the additive is the difference in concentration thereof between the capsule and the polymer, and, in turn, between the polymer and the outside.

15. The process for the additivation of fibres according to claim 1, wherein the encapsulating of the additive within the porous material is permanent, in such a way that the encapsulating of the additive is retained, both during the manufacturing process and during the life of the article, conferring a permanent property to the fibre or polymer.

16. The process for the additivation of fibres according to claim 15, wherein, in order to achieve the permanent encapsulation of an additive, a porous material is chosen with a pore size less than the molecule size of the additive, which, in order to be introduced, are subjected to a prior treatment, in such a way that the structure is modified and can pass through the pores, so that, once the additive is encapsulated the reverse process is applied and the molecule recovers its size.

17. The process for the additivation of fibres according to claim 15, wherein, in order to achieve the permanent encapsulation of an additive, a porous material is used with a sufficiently large pore size so that the additive can enter into its pores in such a way that, following encapsulation of the additive a post-treatment is carried out with xylanes, boranes or germanes, which are adsorbed in the mouth of the pores of the porous material and are then oxidised by treating them with steam or other oxidising agents, blocking the outlet of the encapsulated additive.

18. The process for the additivation of fibres according to claim 1, wherein the encapsulation of the additive is primarily produced by adsorption, absorption, capillary condensation and/or ion exchange thereof in the porous material.

19. The process for the additivation of fibres according to claim 1, wherein the incorporation of the capsule into the polymer matrix of the fibre or polymer is done during the polymerisation stage.

20. The process for the additivation of fibres according to claim 1, wherein the additive to encapsulate is selected from the group consisting of, essences, cosmetics, anti-cellulite, firming, anti-wrinkle, anti-oxidant, anti-stretch marks, minerals, trace elements, moisturising, deodorant, aloe-vera, essential oils, collagen, natural extracts, caffeine, retinol, vitamins, menthol, anti-mosquito, anti-stain, anti-odour, anti-mite, medicines, chromophores, dyes, and colorants.

21. A process for the additivation of polymers, said process comprising the steps of:
encapsulating an additive into the pores of particles of a porous material to form capsules;
incorporating the particles of the porous material into the matrix of the polymer; and
polymerisation, extrusion and/or injection of the polymer; said encapsulation of the additives in the pore protecting it from the temperatures and other conditions of the different manufacturing processes which the polymers will undergo and the introduction of the additive into the matrix thereof, the porous material being a material selected from the group consisting of a metal oxide, a silicate, an aluminophosphate, clay, carbon material, a hybrid organic-inorganic material and a porous polymer,
wherein the porous material has a mesoporous porosity being a pore size in the range of 2 nm and 50 nm, and wherein the particles are of a size in the range of 100 nm to 200 microns.

22. The process for the additivation of polymers according to claim 21, wherein said process protects the additives from the manufacturing processes for fibres or polymers at a process temperature of 150-300° C.

23. The process for the additivation of polymers according to claim 21, wherein the capsules incorporated into the polymer matrix of the fibre or the matrix of the polymer are of a metal oxide selected from the group consisting of silica, an alumina, titanium dioxide, magnesium oxide, iron oxide, zinc oxide, and zirconium oxide.

24. The process for the additivation of polymers according to claim 21, wherein the capsules incorporated into the polymer matrix of the fibre are of a material selected from the group consisting of an aluminophosphate, a phosphate, a zeolite and mesoporous silicates.

25. The process for the additivation of polymers according to claim 21, wherein the capsules incorporated into the polymer matrix of the fibre or the matrix of the polymer are of a clay selected from the group consisting of kaolin, smectite, vermiculite, atapulgite, and sepiolite.

26. The process for the additivation of polymers according to claim 21, wherein the capsules incorporated into the polymer matrix of the fibre are of a carbon material, selected from the group consisting of activated charcoal, molecules sieves of carbon, superactivated charcoal, nanotubes of carbon, and lignite.

27. The process for the additivation of polymers according to claim 21, wherein the capsules incorporated into the polymer matrix of the fibre are of a porous polymer with melting points and/or decomposition temperatures higher than the process temperature of the polymer to additivate.

28. The process for the additivation of polymers according to claim 21, further comprising the step of non-permanent encapsulation of an additive within a porous material, for controlled dosing of the additive taking place.

29. The process for the additivation of polymers according to claim 21, wherein the porous material is activated/dehydrated by heating to a temperature of between 150-500° C. to obtain a moisture content in the porous materials of less than 5%.

30. The process for the additivation of polymers according to claim 21, wherein the additive to encapsulate is mixed with the porous material during a period of time varying between 2 to 24 hours, with continuous grinding in a ball mill in order to promote additive/capsule contact, and heating or cooling in order to maintain a temperature varying between −5° C. and 80° C., depending on the type of additive to encapsulate and the nature of the porous material selected as capsule, in order to accelerate the adsorption equilibrium between the additive and the porous particles, in such a way that the additive-capsule proportions being in the range from 1/10 to 1/1.

31. The process for the additivation of polymers according to claim 28, wherein the post-treatments micronisation thereof, for a period of time varying from 3 minutes to 5 hours.

32. The process for the additivation of polymers according to claim 28, wherein the driving force for dosing of the additive is the difference in concentration thereof between the capsule and the polymer, and, in turn, between the polymer and the outside.

33. The process for the additivation of polymers according to claim 21, wherein the permanent encapsulation of the additive within a porous material, in such a way that it is retained, both during the manufacturing process and during the life of the article, conferring a permanent property to the fibre or polymer.

34. The process for the additivation of polymers according to claim 33, wherein, in order to achieve the permanent encapsulation of an additive, a porous material is chosen with a pore size less than the molecule size of the additive, which, in order to be introduced, are subjected to a prior treatment, in such a way that the structure is modified and can pass through the pores, so that, once the additive is encapsulated the reverse process is applied and the molecule recovers its size.

35. The process for the additivation of polymers according to claim 33, wherein, in order to achieve the permanent encapsulation of an additive, a porous material is used with a sufficiently large pore size so that the additive can enter into its pores in such a way that, following encapsulation of the additive a post-treatment is carried out with xylanes, boranes or germanes, which are adsorbed in the mouth of the pores of the porous material and are then oxidised by treating them with steam or other oxidising agents, blocking the outlet of the encapsulated additive.

36. The process for the additivation of polymers according to claim 21, wherein the encapsulation of the additive is primarily produced by adsorption, absorption, capillary condensation and/or ion exchange thereof in the porous material.

37. The process for the additivation of polymers according to claim 21, wherein the incorporation of the capsules into the polymer matrix of the fibre or polymer is done during the polymerisation stage.

38. The process for the additivation of polymers according to claim 21, wherein the incorporation of the capsules into the polymer matrix of the polymer is done during the extrusion or injection stage.

39. The process for the additivation of polymers according to claim 21, wherein the additive to encapsulate is selected from the group consisting of, essences, cosmetics, anti-cellulite, firming, anti-wrinkle, anti-oxidant, anti-stretch marks, minerals, trace elements, moisturising, deodorant, aloe-vera, essential oils, collagen, natural extracts, caffeine, retinol, vitamins, menthol, anti-mosquito, anti-stain, anti-odour, anti-mite, medicines, chromophores, dyes, and colorants.

* * * * *